United States Patent Office.

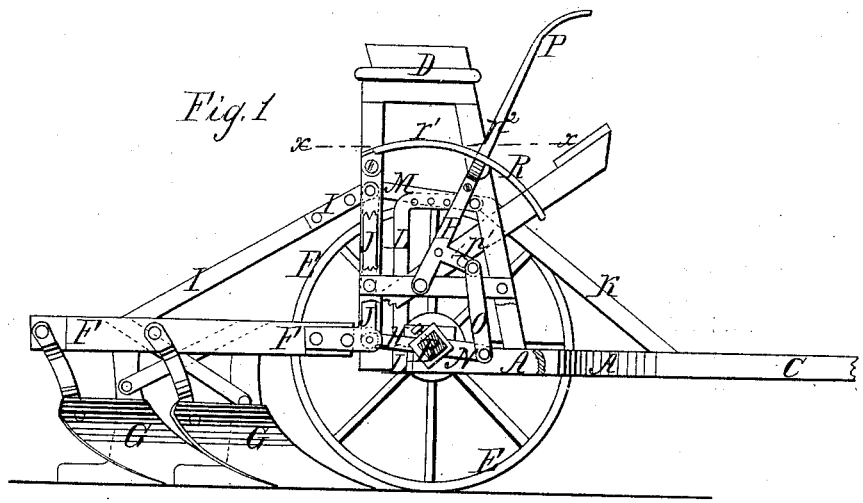
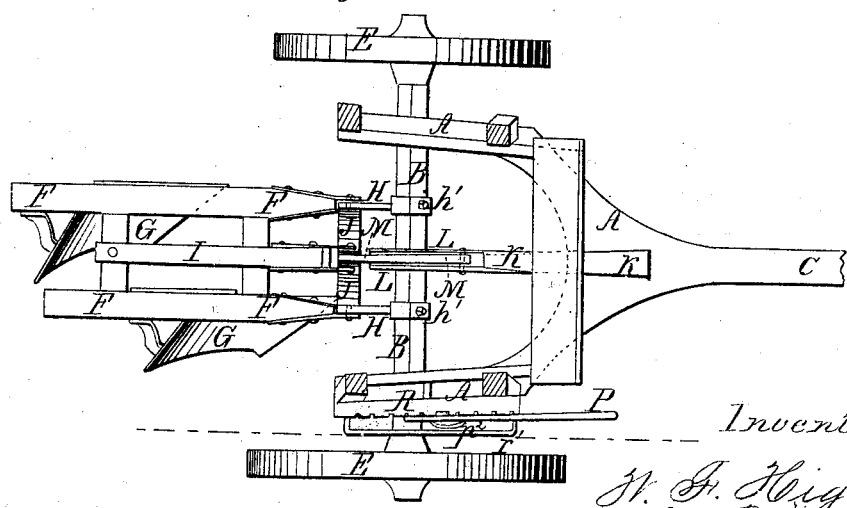

W. F. HIGGINS AND JEROME PERRY, OF WATSONVILLE, CALIFORNIA.

Letters Patent No. 76,447, dated April 7, 1868.

---

IMPROVEMENT IN GANG-PLOUGHS.

---

The Schedule referred to in these Letters Patent and making part of the same.

---

TO ALL WHOM IT MAY CONCERN:

Be it known that we, W. F. HIGGINS and JEROME PERRY, of Watsonville, in the county of Santa Cruz, and State of California, have invented a new and useful Improvement in Gang-Ploughs; and we do hereby declare that the following is a full, clear, and exact description thereof, which will enable others skilled in the art to make and use the same, reference being had to the accompanying drawings, forming part of this specification.

Figure 1 is a side view of our improved machine, parts being broken away to show the construction.

Figure 2 is a top view of the same, partly in section, through the line $x\ x$, fig. 1.

Similar letters of reference indicate corresponding parts.

Our invention has for its object to furnish improved devices for connecting the plough-frame to the sulky or wagon-frame, and for raising and lowering the plough-frame and ploughs as may be desired; and it consists in the construction and combination of the parts by means of which these objects are effected, as hereinafter more fully described.

A is the frame of the sulky or wagon, which is supported by the axle B, to the forward end of which the tongue C is attached, and which supports the driver's seat D. E are the wheels, the one of which that runs upon the unploughed land should be made smaller than the other, so that the machine may stand level when working. F is the frame, to which one or more ploughs G are attached. H are arms, the rear ends of which are jointed or pivoted to the forward end of the plough-frame F, and through the forward ends of which are formed square holes, through which the axle B passes, so that the said bars may be slid along the axle B, to adjust the relative position of the ploughs. The bars H, when adjusted, are secured in place by set-screws $h'$, as shown in fig. 2. I is an inclined bar or beam, the rear end of which is securely attached to the rear part of the frame F, and the forward end of which is supported by the supports or braces J, the upper ends of which are attached to the forward or upper end of the inclined beam I, and the lower ends of which are attached to the forward end of the plough-frame F. K is an inclined beam, the lower end of which is secured to the forward part of the frame A; and the rear end of which is supported by the bars or plates L, the upper ends of which are attached to the rear end of the inclined beam K, and the lower ends of which are attached to the rear part of the frame A. M is a bar, the rear end of which is pivoted to the forward or upper end of the inclined beam I, and the forward end of which is adjustably pivoted to the horizontal parts of the bars or plates L, as shown in figs. 1 and 2. The bar M we prefer to adjust in such a way that it may be parallel with the bar H, as shown in fig. 1. By this construction, as the axle B is partially revolved in its bearings in the frame A, the frame F will be raised or lowered, being always held parallel with the surface of the ground. N is an arm, having a square hole formed through one end to fit upon the axle B. To the outer end of the arm N is pivoted the lower end of the short connecting-bar O, the upper end of which is adjustably pivoted to the short arm $p^1$ of the lever P. The lower end of the lever P is pivoted to the framework of the sulky or wagon, or to a bar attached to said framework, and its upper end extends up into such a position as to be reached and operated by the driver from his seat. R is a rack, attached to the framework of the sulky or wagon, in such a position that its teeth may take hold of the lever P, and hold it securely in any position in which it may be placed. The lever P is held up against the teeth of the rack R by a spring, $p^2$, attached to the side of the said lever, and which presses against the guard-bar $r'$, connected with the rack R. By this construction, by operating the lever P, the axle B will be partially revolved, raising or lowering the plough-frame and ploughs, as may be desired.

We claim as new, and desire to secure by Letters Patent—

1. The combination of the inclined beams I and K, braces or supporting-bars J and L, adjustable pivoted bar M, and pivoted bars H, with each other, with the plough-frame F, sulky or wagon-frame A, and axle B, substantially as herein shown and described, and for the purpose set forth.

2. The combination of the lever P, connecting-bar O, and arm N, with each other, with the axle B, and framework of the sulky or wagon, substantially as herein shown and described, and for the purpose set forth.

W. F. HIGGINS,
JEROME PERRY.

Witnesses:
ALFRED DEVOE,
J. A. WARNER.